(12) United States Patent
Greene, Jr. et al.

(10) Patent No.: US 6,572,130 B2
(45) Date of Patent: Jun. 3, 2003

(54) THREE-WHEELED VEHICLE

(76) Inventors: H. Peter Greene, Jr., 12 Wards Way, Boyertown, PA (US) 19512; Leonard R. Clark, Jr., 128 Weldy Ave., Oreland, PA (US) 19075

( * ) Notice: Subject to any disclaimer, the term of this patent is extended or adjusted under 35 U.S.C. 154(b) by 0 days.

(21) Appl. No.: 09/910,938

(22) Filed: Oct. 11, 2001

(65) Prior Publication Data

US 2002/0047245 A1 Apr. 25, 2002

Related U.S. Application Data

(60) Provisional application No. 60/220,166, filed on Jul. 24, 2000.

(51) Int. Cl.⁷ .............................. B62K 5/06; B62K 21/00
(52) U.S. Cl. .................... 280/266; 280/268; 280/288.1; 280/282
(58) Field of Search ................................. 280/259, 266, 280/268, 267, 282, 288.1, 288.3; D12/112

(56) References Cited

U.S. PATENT DOCUMENTS

| | | |
|---|---|---|
| 1,494,364 A | 5/1924 | McGrath |
| 2,812,194 A | 11/1957 | Ajero |
| 3,282,606 A | 11/1966 | Casner |
| 3,311,388 A | 3/1967 | Ryan et al. |
| 3,392,991 A | 7/1968 | Ryan et al. |
| 3,442,528 A | 5/1969 | Rademacher |
| 3,504,934 A | 4/1970 | Wallis |
| 3,620,547 A | 11/1971 | Vaverek |
| 3,669,468 A | 6/1972 | Rich |
| 3,981,516 A | 9/1976 | Haggkvist |
| 4,103,921 A | 8/1978 | Brooks et al. |
| 4,109,927 A | 8/1978 | Harper |
| 4,198,072 A | 4/1980 | Hopkins |
| 4,279,429 A | 7/1981 | Hopkins et al. |
| 4,359,231 A | 11/1982 | Mulcahy |
| 4,432,561 A | 2/1984 | Feikema et al. |
| 4,526,392 A | 7/1985 | Berkstresser |
| D280,309 S | 8/1985 | Forbes et al. |
| 4,826,190 A | 5/1989 | Hartmann |
| 5,568,935 A | 10/1996 | Mason |
| 5,853,184 A | * 12/1998 | Lofgren et al. ........... 280/242.1 |
| 6,105,986 A | * 8/2000 | Franks et al. ................ 280/250 |

* cited by examiner

Primary Examiner—Avraham Lerner
(74) Attorney, Agent, or Firm—Michael de Angeli

(57) ABSTRACT

A three wheeled vehicle comprises a front subframe having a front wheel journaled thereto and a seat for a rider mounted thereon, and a rear subframe having a pair of rear wheels journaled thereto. The front subframe is journaled to the rear subframe at a kingpin axis, which defines a caster angle with respect to the vertical. The kingpin axis is spaced by a trail dimension from the rear axle axis. The caster angle and trail dimension, together with the wheelbase dimension between the front and rear axle axes and the track dimension across the rear wheels, are chosen cooperatively to define the desired handling characteristics of the vehicle.

10 Claims, 3 Drawing Sheets

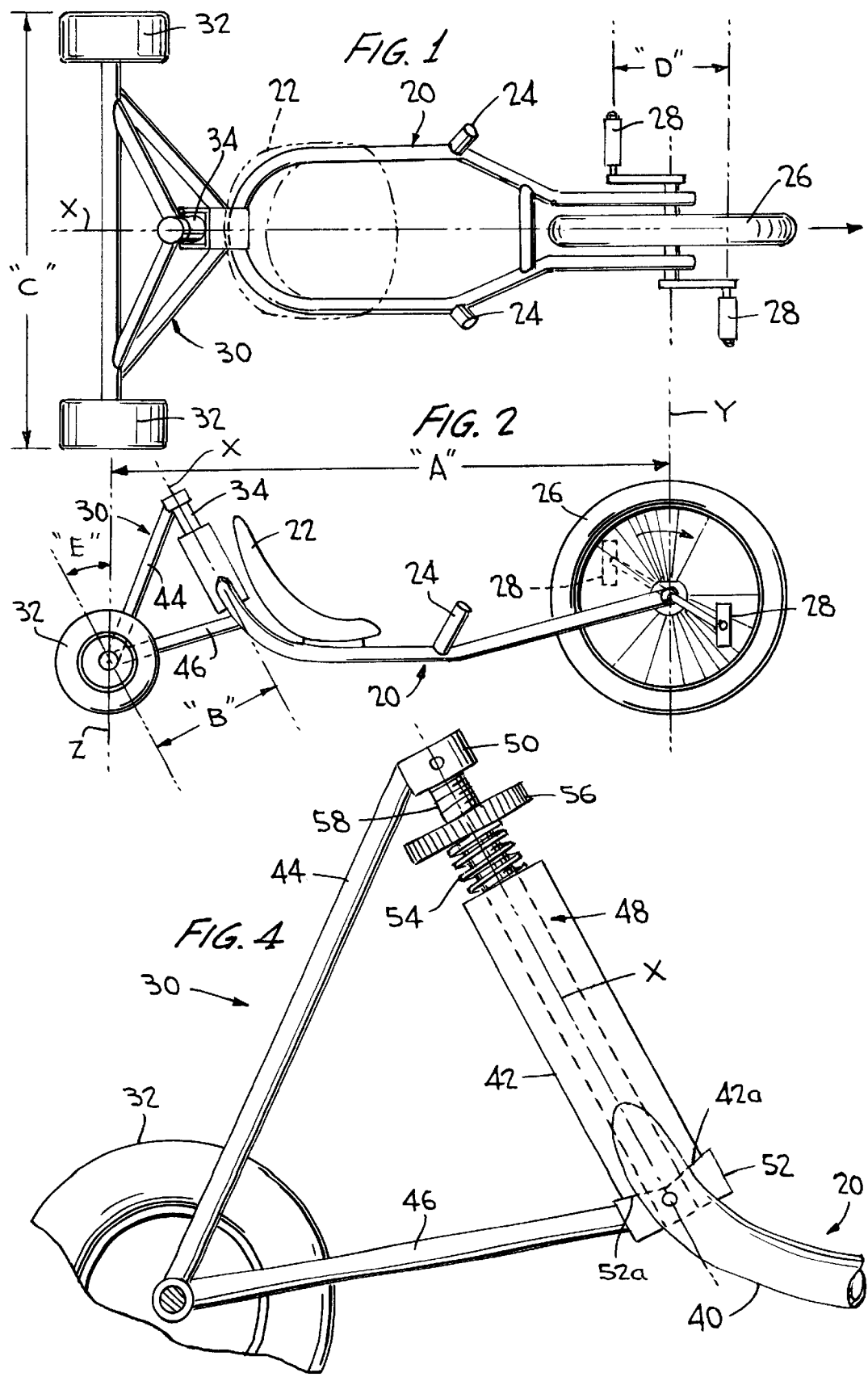

THREE-WHEELED VEHICLE

CROSS-REFERENCE TO RELATED APPLICATION

This application claims priority from Provisional Patent Application Ser. No. 60/220,166, filed Jul. 24, 2000.

FIELD OF THE INVENTION

This invention relates to three-wheeled vehicles, principally human-powered three-wheeled vehicles, although the teachings of the invention also have application to three-wheeled vehicles powered by internal combustion engines or the equivalent.

BACKGROUND OF THE INVENTION

Various three-wheeled human-powered vehicles have been known for many years. The common child's tricycle exemplifies such known vehicles. In a conventional tricycle, the child sits on a seat fixed with respect to the vehicle frame. Freewheeling rear wheels are carried by the frame, and steering is accomplished by turning a front wheel pivoted to the frame at a steering head; the child propels the vehicle by way of pedals connected directly to the front wheel. The more recent "Big Wheel" is conceptually identical, although having a different appearance due to the rider's relatively recumbent seating position, and because the Big Wheel is assembled largely of molded plastic components, rather than having a fabricated painted steel frame as does a conventional tricycle.

In U.S. Pat. No. 3,504,934, Wallis teaches a three-wheeled vehicle which can be human- or engine-powered. As in a conventional tricycle, the rider sits on a seat fixed to a frame, and a front wheel is pivotally attached to this frame for steering. However, in Wallis, the rear wheels are carried by a rear subframe, which is attached to the main frame by one of several types of pivoted joint allowing the main frame to lean into a turn, as in a conventional bicycle, and allowing the rear wheels to follow the direction of travel of the vehicle. The angle of the pivot axis defined between the main frame and subframe with respect to the horizontal is not specified, but appears to be relatively close, perhaps within 25°, to the horizontal.

Mulcahy U.S. Pat. No. 4,359,231 shows a three-wheeled vehicle having a front subframe carrying a front wheel, the axis of which is fixed with respect to the front subframe, and a rear subframe carrying a pair of rear wheels, the axis of which is similarly fixed with respect to the rear subframe. The rider sits on the front subframe, but his or her back is received by a back rest fixed to the rear subframe. The front and rear subframes are pivoted to one another at a pivot point inclined with respect to the vertical, so that as the rider leans to one side, the rear subframe is pivoted with respect to the front subframe, whereby the rear wheels steer the vehicle and the front wheel leans into the turn, as in a conventional bicycle.

As noted, in the Mulcahy vehicle, the rider's posterior is received by a seat secured to the front subframe, while his or her back is received by a back rest secured to the rear subframe; this would appear to be extremely uncomfortable. The Mulcahy vehicle as shown places the pivot axis at which the front and rear subframes pivot with respect to one another just forward of the rear axle; according to the experiments of the present inventors, as discussed further below, such a vehicle would be violently unstable and extremely difficult to ride with any degree of confidence.

Other two- and three-wheeled vehicles of varying design are shown by the following patents: U.S. Pat. No. 3,620,547 to Vavarek, U.S. Pat. No. 3,669,468 to Rich, U.S. Pat. No. 3,282,606 to Casner, U.S. Pat. No. 3,442,528 to Rademacher, U.S. Pat. No. 3,311,388 to Ryan et al, U.S. Pat. No. 3,981,516 to Haggkvist, U.S. Pat. No. 4,103,921 to Brooks et al, U.S. Pat. No. 3,392,991, also to Ryan et al, U.S. Pat. No. 4,198,072 to Hopkins, U.S. Pat. No. 5,568,935 to Mason, U.S. Pat. No. 4,526,392 to Berkstresser, U.S. Pat. No. 4,279,429 to Hopkins et al, U.S. Pat. No. 4,432,561 to Feikema et al, U.S. Pat. No. 1,494,364 to McGrath, U.S. Pat. No. 2,812,194 to Ajero, U.S. Pat. No. 4,826,190 to Hartmann, and U.S. Pat. No. 4,109,927 to Harper, and by design Pat. No. 280,309 to Forbes et al.

SUMMARY OF THE INVENTION

The invention concerns a novel three-wheeled vehicle having a forward portion including a front wheel, and on which the rider sits, and a rear portion having spaced rear wheels. The front portion is pivoted to the rear portion at an inclined steering pivot joint located behind the rider's seat, so that the vehicle is steered by the rider leaning in the desired direction. The handling characteristics of the vehicle are controlled by the selection of several critical dimensions of various components.

BRIEF DESCRIPTION OF THE DRAWINGS

FIG. 1 shows a plan view of one embodiment of the vehicle of the invention;

FIG. 2 shows a side view of the vehicle in the embodiment of FIG. 1;

FIG. 4 shows a detail of one possible alternative embodiment of the steering pivot joint.

DESCRIPTION OF THE PREFERRED EMBODIMENTS

Figure 3:
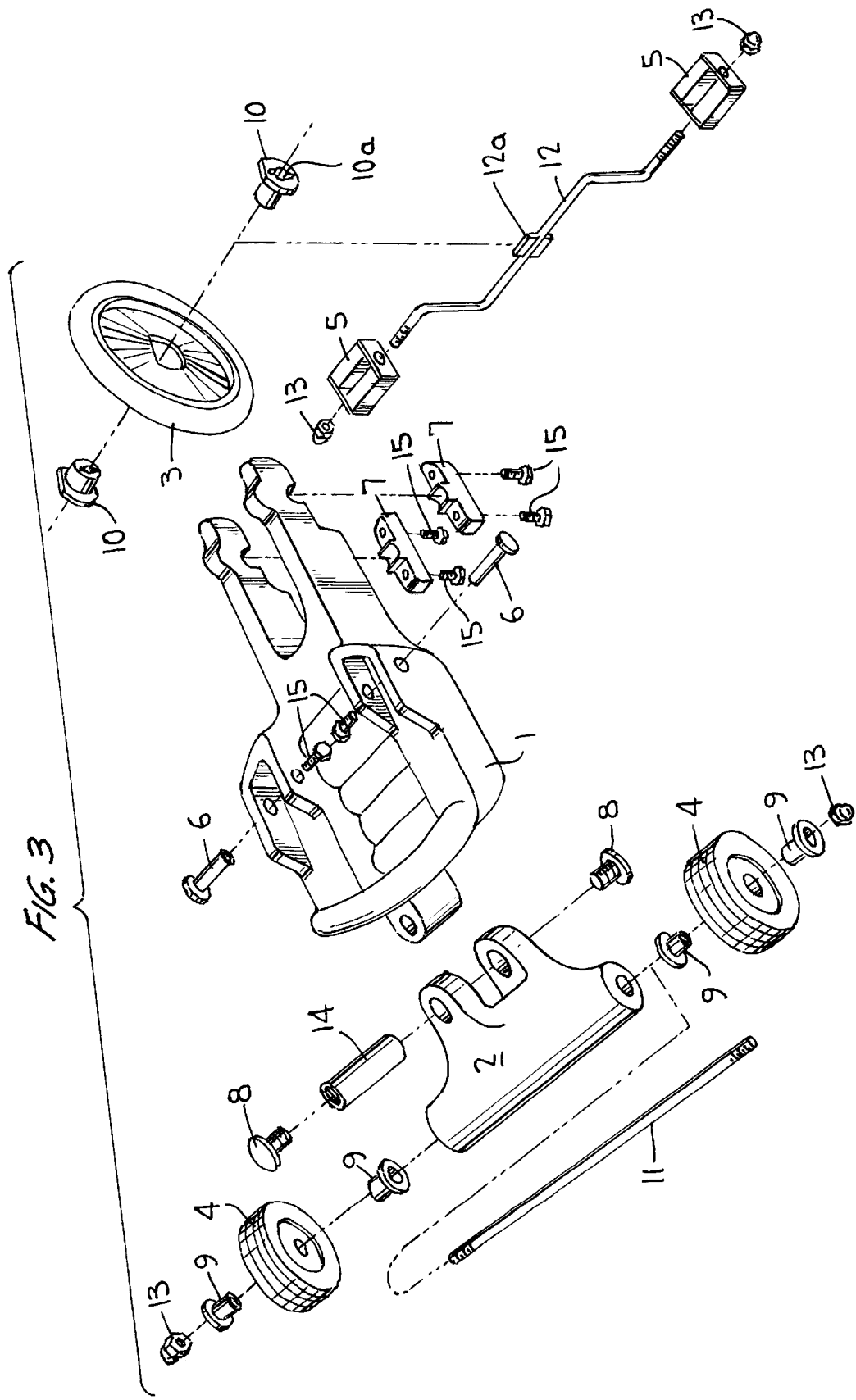
FIG. 3 is an exploded view of a second embodiment of the invention.

As indicated above, FIGS. 1 and 2 are drawings of a first embodiment of the invention, wherein the vehicle is fabricated of standard materials and available components, while FIG. 3 is an exploded view of a second embodiment, this embodiment being suited for economic mass-production.

Referring now to the drawings of FIGS. 1 and 2, as illustrated the vehicle of the invention comprises a front subframe 20, to which are mounted a rider's seat 22, a pair of handgrips 24, and a front wheel 26, adapted to be rotated by a pair of pedals 28. More specifically, front wheel 26 rotates about an axis Y fixed with respect to front subframe 20. As shown by FIGS. 1 and 2, front wheel 26 can be journaled between steel tubing members or the like of which front subframe 20 is fabricated, or may be journaled on a conventional bicycle front fork fixed to front subframe 20. In either case, the axis of rotation Y of front wheel 26 is fixed with respect to subframe 20, and is thus also fixed with respect to seat 22 and handgrips 24.

The vehicle of the invention also comprises a rear subframe 30, which, as illustrated by FIGS. 1 and 2, may also be fabricated of steel tubing and other standard materials. Rear wheels 32 are journaled for independent, free rotation about a common axis Z, which may be defined by a single through axle or a pair of stub axles.

Figure 5:
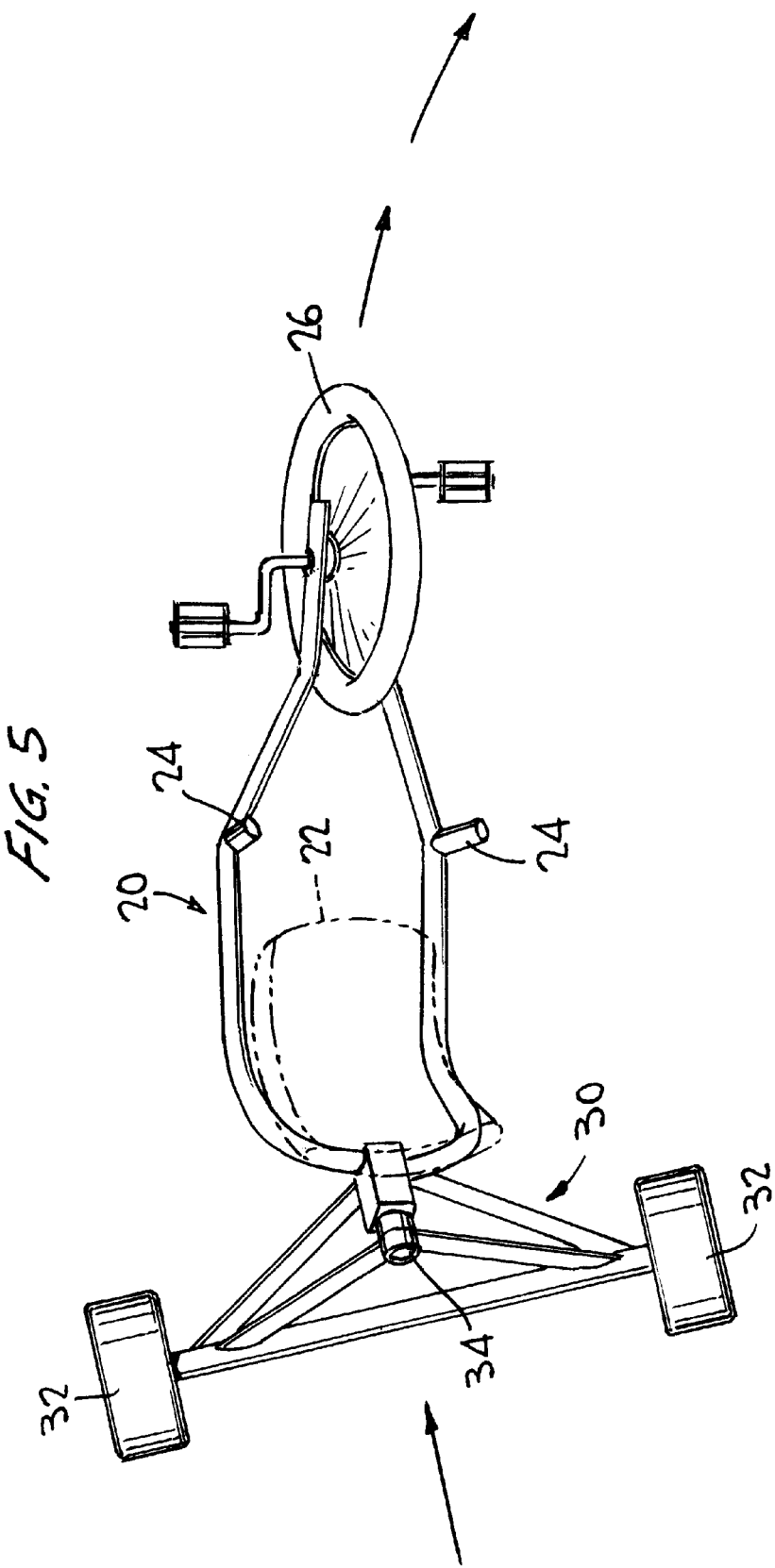
FIG. 5 is view comparable to FIG. 1, but showing the configuration of the vehicle of the invention as it rounds a turn.

Front subframe 20 and rear subframe 30 are pivoted with respect to one another at a central steering pivot 34, the axis X of which is defined by pivot points fixed with respect to both subframes, and comprising a kingpin about which each can pivot. In this embodiment, the front and rear subframes pivot freely about axis X; in an alternative embodiment discussed below with respect to FIG. 4, the kingpin assembly may be provided with a self-centering cam. The vehicle is steered by pivoting front subframe 20 and thus front wheel 26 with respect to the rear subframe 30; steering is initiated by the operator's leaning the entire front subframe 20 and thus the front wheel 26 in the direction of turning, which causes the rear subframe 30 to pivot about axis X, so that the rear wheels 32 effectively steer the vehicle in the desired direction. See FIG. 5.

More specifically, because the axis X defined by steering pivot 34 is inclined with respect to the vertical, and because the spaced rear wheels 32 keep the rear axle parallel to the ground surface, as the front subframe 20 is leaned in the direction of the turn, the front subframe 20 is pivoted with respect to the rear subframe 30, so that the rear wheels effectively steer the vehicle. Moreover, the center of gravity of the vehicle (principally the weight of the operator) moves to the inside of the turn as the front wheel leans, tending to stabilize the vehicle against rolling over. There is only a limited tendency of either rear wheel to leave the ground, as can readily occur with a conventional tricycle, as noted by the Wallis patent discussed above.

FIGS. 1 and 2 show by dimensional arrows the reference points at which certain significant dimensions of the vehicle of the invention are measured. The vehicle may be made in adult-size and child-size versions, as illustrated by the dimensional information given below; the figures given are subject to variation, and do not limit the invention. In the examples, the child-size version was dimensioned at 70% of a successfully-tested adult-size version, but obviously this could vary substantially without departure from the invention.

|  | Adult-size | Child-size |
|---|---|---|
| Wheelbase "A" | 53 inches | 37.1 inches |
| Trail "B" | 12.75 inches | 8.93 inches |
| Track "C" | 42.5 inches | 29.75 inches |
| Rear wheel diameter | 10 inches | 7 inches |
| Front wheel diameter | 23 inches | 16.1 inches |
| Crank stroke "D" | 12 inches | 8.4 inches |
| Caster angle "E" | 28° | 28° |

Testing carried out by the inventors reveal that several of the dimensions noted cooperate with one another to determine the vehicle dynamic characteristics, in particular whether the vehicle tends to travel in a straight line or is easily deflected. One of the clearly relevant dimensions is the "trail", dimension "B" in FIG. 2, that is, the distance between the centerline Z of the rear axle and the axis X of the steering pivot. As indicated above, a typical value for the trail in the adult-sized version of the vehicle of the invention is 12.75 inches. The caster angle "E", i.e., the angle of inclination of the steering pivot 34 with respect to the vertical, also has a significant effect on the handling of the vehicle, as do the wheelbase "A" and rear track "C". However, for a given set of the other dimensions mentioned, the stability of the handling of the vehicle appears to be primarily controlled by the trail dimension "B".

More specifically, for a given value of the caster angle, the wheelbase and the track, if the trail dimension "B" has at least a minimum value, a satisfactory self-correcting "feel" to the handling of the vehicle is provided, i.e., so that when the operator leans to one side the vehicle turns in that direction, and when the operator straightens up, the vehicle tends to steer in a straight line. If the trail "B" is less than such a minimum dimension, the vehicle is unstable, and is hard to steer in a straight line; while if the trail is extended beyond the minimum value needed to provide straight-line stability, the handling becomes "slower", i.e., more lean angle is required for a given degree of steering. Slower steering would be desirable in certain circumstances, e.g., if the vehicle were intended for road or racing use and thus would reach higher speeds, while "quicker" steering is more entertaining and is preferable if the vehicle is essentially being used as a toy.

In general, increasing the caster angle E also slows the steering, and conversely, making the caster angle E more vertical quickens the steering. Similarly, lengthening the wheelbase A or increasing the track C would also tend to slow the steering. Thus, it will be appreciated that the dimensions mentioned are all interrelated and must be selected cooperatively.

The 12.75 inch value for the trail dimension B is essentially the minimum value required to provide straight-line stability to the vehicle of the invention given the other dimensions shown, i.e., in the adult-size embodiment, while as indicated the minimum trail required for stability would be approximately 8.93 inches in the child-size embodiment. Some departure from these figures as the minimum value for the trail dimension B is within the scope of the invention, and as noted, the actual minimum value will vary with the other dimensions of the vehicle.

Still more specifically, expressing the trail B as a function of the wheelbase A, the 12.75 inch value for trail is 24% of the 53-inch wheelbase in the exemplary adult-size vehicle; similarly, the 8.93 inch trail is 24% of the 37.1-inch wheelbase of the exemplary child-size vehicle. These dimensions cooperate with the 28° caster angle and relatively wide track (the track in both versions being 80% of wheelbase) to produce a vehicle which has stable, but "quick" handling; more specifically, such a vehicle is relatively easy to ride in a straight line, turns predictably upon the rider's leaning into a turn, but returns reliably to straight running when the rider leans back upright.

By comparison, as illustrated in the Mulcahy drawings, and as made specific in the text at col. 2, lines 47–50, the sleeve bearing that defines the pivot axis at which the front and rear subframes are joined is actually welded to the rear axle tube; Mulcahy's trail is thus the sum of half the diameters of these two tubes. If tubing of the usual one-inch size were used to fabricate the Mulcahy vehicle, and if it had a wheelbase of 40 inches, as seems approximately correct, the trail would be but 2.5% of the wheelbase. In the opinion of the present inventors, the Mulcahy vehicle would be very difficult to ride controllably; more specifically, although the rider's back is received by a seatback fixed to the rear subframe, and his posterior by a seat bottom, so that the rider might conceivably exert a corrective force therebetween, if this were even possible doing so would be very tiresome.

As mentioned, all of the mentioned dimensions cooperate with one another to determine the vehicle's handling characteristics. Thus, for example, if it were desired to reduce the track to, say, 60% of wheelbase, it would be necessary to increase the trail to on the order of 30% of wheelbase to retain similar handling characteristics; alternatively, or cooperatively, an adjustment could be made to the caster angle. As indicated, the caster angle of the steering pivot joint was 28° in a successfully-tested embodiment of the invention. Obviously the invention is not to be limited to this precise value of the caster angle, as satisfactory steering can be expected to be achievable over a range of caster angles.

Thus, where the caster angle is approximately 28°, and the track is 56% of wheelbase, the trail should be at least about 20–25% of wheelbase, to achieve satisfactorily stable handling. If either or both of the caster angle or track are increased, the trail can be reduced somewhat while providing similar handling characteristics; if the track or caster are decreased, the trail should be increased correspondingly if the handling is not to become undesirably "quick".

No brakes are shown in this embodiment of the vehicle of the invention, but it will be apparent that (for example) conventional hand-operated bicycle caliper brakes could readily be adapted to braking the front wheel, and that a disk brake could readily be provided on the rear axle. Similarly, it is within the skill of the art to provide a free-wheeling mechanism between pedals 28 and front wheel 26, so that the operator could cease pedaling, e.g., on downhills. It is also within the skill of the art to provide a variable-speed transmission allowing operator selection of the ratio between rotation of the pedals and front wheel. Such a transmission could be an in-axle epicyclic type or a derailleur type; employment of the latter of course would necessitate a chain drive wherein the axis of pedaling was spaced from the axis of the front wheel. All of these alternatives are within the scope of the invention, and their implementation is within the skill of the art. Similarly, although the invention was conceived and has been described as a human-powered vehicle, it is within the scope of the invention to provide an internal-combustion engine or an electric motor to propel the vehicle, while using the teachings of the invention regarding the relevant geometrical parameters to provide predictable and safe, yet exciting handling characteristics.

FIG. 3 shows as mentioned a second embodiment of the invention, identical in concept but manufactured using techniques and materials suited for economical mass-production, particularly where the vehicle is sized for a child and therefore need not be capable of standing up to the stress that would be exerted on the vehicle by an adult. In this embodiment the front subframe 1 and the rear subframe 2 may be blow-molded of polypropylene, as may front wheel 3, rear wheels 4, and pedals 5. Hand grips 6, pillow blocks 7 (which secure the front axle/crank shaft 12 to the front subframe 1) and front and rear wheel bearings 10 and 9, respectively, may all be injection molded of nylon. The rear axle 11 and front axle/crank shaft 12 are fabricated of, e.g., ⅜-inch diameter round steel bar stock. As shown, front axle may be stamped to define a keyed central portion 12a fitting within keyed bores 10a in bearings 10, which are in turn keyed to front wheel 3, so that torque applied by the rider to pedals 5 is effectively transmitted to wheel 3. Kingpin 14 is a section of steel tubing, e.g., ¾-inch diameter, 20-gauge material, and is secured in place by plugs 8, also injection molded of nylon. Standard nuts 13 hold the pedals 5 on the crankshaft 12 and secure the rear wheels to the rear axle 11, and standard screws 15 secure the pillow blocks 7 and handgrips 6 to the front subframe 1.

As mentioned above, in the FIGS. 1–3 embodiments, the front and rear subframes pivot freely with respect to one another about the kingpin axis X; that is, there is no mechanical device urging the front and rear subframes toward the straight-ahead alignment. FIG. 4 shows an alternative construction of the kingpin assembly in which a mechanical alignment aid is provided, and also provides further detail as to one possible design of the kingpin assembly. As illustrated, the front subframe 20 comprises seat rails 40 welded or otherwise secured to tubular outer kingpin member 42. Rear subframe 30 comprises upper struts 44 and lower struts 46, fixed to upper collar 50 and lower collar 52, to which inner kingpin member 48 is fixed. Inner and outer kingpin members 48 and 42 respectively are journaled to one another by bearings or bushings (not shown) such that they pivot with respect to one another despite the end loading thereon due to the rider's weight.

The kingpin assembly as described to this point can apply equally to the FIGS. 1 and 2 embodiment, although of course other forms of kingpin assembly are within the skill of the art and the scope of the invention. However, in the FIG. 4 embodiment, generally V-shaped cam surfaces 42a formed on opposite sides of the lower end of outer kingpin member 42 cooperate with mating surfaces 52a formed in lower collar 52 to provide a preferred respective position of inner and outer kingpin members 42 and 48; as will be apparent, the cam surfaces 42a and mating surfaces 52a are aligned such that the vehicle proceeds straight ahead except when the rider inclines to one side or the other, to steer the vehicle. The rider's weight urges the cam surfaces together, providing a self-aligning action; to provide further self-centering, and to prevent rattling of the components when the rider is not present, a spring 54 may be provided arranged as shown to urge the cam surfaces together. A threaded knob 56 cooperating with a thread 58 on inner kingpin member 48 may be provided to allow adjustment of the amount of self-centering provided by spring 54. It is acknowledged that Wallis shows a generally similar self-aligning mechanism in FIGS. 7 and 8.

Numerous other alterations and improvements on the invention will occur to those of skill in the art, and the invention is therefore not to be limited to the precise embodiments shown.

What is claimed is:

1. A vehicle, comprising:
   a front subframe;
   a seat for a rider fixed to said front subframe;
   a front wheel, journaled to said front subframe at a front axle axis;
   a rear subframe;
   a pair of rear wheels spaced transversely from one another by a track dimension on either side of said rear subframe, and journaled for rotation about a rear axle axis spaced by a wheelbase dimension from said front axle axis;
   wherein said rear subframe is journaled to said front subframe at a kingpin axis behind said seat by a freely-pivoting journaled connection, such that said vehicle is steered by leaning said front subframe in the desired direction of turning, said kingpin axis being inclined to the vertical by a caster angle, and said kingpin axis being spaced from the rear axle axis by a trail dimension, said wheelbase, track, and trail dimensions and said caster angle being chosen cooperatively to provide desired handling characteristics to said vehicle, such that the vehicle is stable in operation.

2. The vehicle of claim 1, wherein when said caster angle is approximately 28° and said track dimension is at least approximately 50% of said wheelbase dimension, said trail dimension is at least 20% of said wheelbase dimension.

3. The vehicle of claim 1, wherein said rear subframe is journaled to said front subframe by cooperating coaxial members defining said kingpin axis.

4. The vehicle of claim 1, further comprising a pair of pedals journaled with respect to said front subframe and adapted to receive the feet of the rider and transmit torque therefrom to said front wheel to propel said vehicle.

5. The vehicle of claim 4, wherein said rear wheels are journaled for free rotation about said rear axle axis.

6. The vehicle of claim 1, wherein said seat for a rider comprises a seat portion and a back rest portion, and both seat portion and said back rest portion are fixed to said front subframe.

7. The vehicle of claim 6, further comprising a pair of handgrips fixed to said front subframe.

8. The vehicle of claim 1, wherein said trail dimension is at least about 24% of said wheelbase dimension.

9. The vehicle of claim 1, wherein said front and rear subframes are molded plastic members defining said front and rear axle axes and said kingpin axis.

10. A vehicle, comprising:

a front subframe;

a seat for a rider fixed to said front subframe;

a front wheel, journaled to said front subframe at a front axle axis;

a rear subframe;

a pair of rear wheels spaced transversely from one another by a track dimension on either side of said rear subframe, and journaled for rotation about a rear axle axis spaced by a wheelbase dimension from said front axle axis;

wherein said rear subframe is journaled to said front subframe at a kingpin axis behind said seat by a freely-pivoting journaled connection, said kingpin axis being inclined to the vertical by a caster angle, and said kingpin axis being spaced from the rear axle axis by a trail dimension, and wherein when said caster angle is approximately 28° and said track dimension is at least approximately 50% of said wheelbase dimension, said trail dimension is at least 20% of said wheelbase dimension, such that the vehicle is stable in operation.

* * * * *